United States Patent
Jacobson et al.

(10) Patent No.: US 7,898,207 B2
(45) Date of Patent: Mar. 1, 2011

(54) METHOD FOR CONTROLLING A DC MOTOR

(75) Inventors: Gary S. Jacobson, Norwalk, CT (US); Wesley A. Kirschner, Farmington, CT (US); Michael M. Chen, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 561 days.

(21) Appl. No.: 11/950,096

(22) Filed: Dec. 4, 2007

(65) Prior Publication Data

US 2009/0141061 A1 Jun. 4, 2009

(51) Int. Cl.
*H02P 6/00* (2006.01)

(52) U.S. Cl. ........................ 318/721; 318/560; 318/779; 318/799

(58) Field of Classification Search ................. 318/560, 318/568.18, 400.01, 400.14, 461, 280, 700, 318/721, 779, 799, 822, 823, 445, 701; 400/279, 400/283, 315
See application file for complete search history.

(56) References Cited

U.S. PATENT DOCUMENTS

| | | | |
|---|---|---|---|
| 4,558,265 A | 12/1985 | Hayashida et al. | |
| 4,591,969 A | 5/1986 | Bloom et al. | |
| 4,988,935 A | 1/1991 | York | |
| 5,844,394 A * | 12/1998 | Mushika et al. | 318/696 |
| 6,483,270 B1 * | 11/2002 | Miyazaki et al. | 318/700 |
| 6,528,962 B1 * | 3/2003 | Igarashi et al. | 318/461 |
| 6,538,407 B2 * | 3/2003 | Tanaka | 318/445 |
| 6,654,321 B2 * | 11/2003 | Okada et al. | 369/44.28 |
| 6,838,855 B2 * | 1/2005 | Kobayashi et al. | 318/800 |
| 7,075,262 B2 * | 7/2006 | Igarashi | 318/560 |
| 7,106,668 B2 * | 9/2006 | Okada et al. | 369/30.27 |
| 7,121,749 B2 * | 10/2006 | Morikawa et al. | 400/283 |
| 7,312,595 B2 * | 12/2007 | Kamio et al. | 318/701 |

FOREIGN PATENT DOCUMENTS

| | | |
|---|---|---|
| EP | 0786710 A1 | 7/1997 |
| EP | 1258789 A2 | 11/2002 |

* cited by examiner

*Primary Examiner*—Walter Benson
*Assistant Examiner*—Antony M Paul
(74) *Attorney, Agent, or Firm*—Brian A. Collins; Charles M. Malandra, Jr.

(57) ABSTRACT

A method of controlling a motor to cause it to execute a move toward a target position including calculating a deceleration position, wherein when the deceleration position is reached, the motor will be caused to execute a deceleration in a manner that will result in the motor stopping short of the target position, and determining whether the requested move is a first move type after the motor has reached the deceleration position and the deceleration is complete. If the requested move is a first move type, the method includes causing the motor to move toward the target position at a first velocity, and if the requested move is a second move type, the method includes causing the DC motor to move toward the requested target position at a second velocity, wherein the second velocity is greater than the first velocity. Settling time is also varied depending on move type.

20 Claims, 2 Drawing Sheets

METHOD FOR CONTROLLING A DC MOTOR

FIELD OF THE INVENTION

The present invention relates to motor controls, and in particular to a method for controlling a DC motor such as may be used in, for example and without limitation, an inkjet printer application.

BACKGROUND OF THE INVENTION

Inkjet printers are well known in the art, and are utilized in many different printing applications. For example, the metering/printing modules of many current mailing machines utilize inkjet printing technology to print evidence of postage, such as postal indicia that include a 2-D barcode. Conventional inkjet printers employ a print head assembly having an array of individual nozzles for depositing ink onto an item of print media, such as plain white paper or an envelope.

Many inkjet printers employ what is known as a shuttle print head assembly. A shuttle print head assembly employs a moveable print head assembly capable of shuttling back and forth in a direction orthogonal to the direction of media feed. Consequently, shuttle print head assemblies are capable of fully covering the printable area of a page in bands or swaths of coverage. In addition, inkjet printers typically employ a feed mechanism, such as a plurality of rollers, that is driven by an electric motor (e.g., by way of a belt assembly) for transporting the print media along the feed direction of the printer as items are printed on the media during one or more print swaths. Such motors frequently utilize a feedback loop employing a PID (proportional, integral, derivative) controller in order to more precisely control the feed of the media. Thus, an inkjet printer employing a shuttle print head assembly is capable of covering the entire face of the media by incrementally moving the media through the print station as the shuttle print head assembly passes back and forth in bands of coverage.

One of the challenges of inkjet printing is to minimize the stitch lines that occur on prints when multiple connecting swaths are printed on a piece of media. In order to get higher quality prints, it is desirable to use a DC motor in the transport of an inkjet printer. However, implementing an algorithm to precisely control a DC motor in an inkjet printer presents a number of challenges, particularly in the case where a lower cost shuttle print head assembly including a clutch system that does not permit reverse motion is desired. As noted above, PID controllers are often employed to increase transport accuracy. However, PID controllers often result in the motor overshooting the target position, which in turn may lead to problems such as double feeds. Also, in order to increase throughput, it is highly desirable to minimize the settling time of the DC motor in order to avoid wavy prints. However, in order to avoid wavy prints, printing cannot begin until the DC transport motor has sufficiently settled. As a result, settling time must be carefully chosen and monitored. There is thus room for improvement in the field of DC motor control, particularly for inkjet printer transport applications.

SUMMARY OF THE INVENTION

In one embodiment, the invention provides a method of controlling a DC motor, such as a DC transport motor forming a part of a printer (e.g., an inkjet printer) to cause the DC motor to execute a requested move toward a requested target position. The DC motor is structured to execute a first move type and a second move type different than the first move type. The method includes steps of calculating a deceleration position for the DC motor, wherein when the deceleration position is reached, the DC motor will be caused to execute a deceleration in a manner that will result in the DC motor stopping short of the requested target position, and determining whether the requested move is a first move type after the DC motor has reached the deceleration position and the deceleration is complete. If the requested move is a first move type, the method includes causing the DC motor to move toward the requested target position at a first velocity, and if the requested move is a second move type, the method includes causing the DC motor to move toward the requested target position at a second velocity, wherein the second velocity is greater than the first velocity.

In one particular embodiment, the DC motor is caused to move based on a periodically determined desired motor position that is provided to a closed loop controller, such as, without limitation, a PID controller, a PI controller, or a lead/lag controller. In this embodiment, causing the DC motor to move toward the requested target position at a first velocity comprises incrementing the then current desired position a first predetermined amount and providing the incremented desired position to the closed loop controller, and causing the DC motor to move toward the requested target position at a second velocity comprises incrementing the then current desired position a second predetermined amount and providing the incremented desired position to the closed loop controller, wherein the second predetermined amount is greater then the first predetermined amount. Preferably, motor position is based on a count of an encoder, wherein the first predetermined amount is a first predetermined number of encoder counts (such as one) and the second predetermined amount is a second predetermined number of encoder counts (such as four).

In another particular embodiment, the DC motor is caused to move based on a periodically determined desired motor position. The method in this embodiment further includes determining whether the current desired position is greater than or equal to the requested target position after the DC motor has reached the deceleration position and the deceleration is complete, if the current desired position is greater than or equal to the requested target position, declaring the DC motor to be in a hold state, and when the DC motor is in the hold state, declaring the requested move to be completed after a first settling time has expired if the requested move is a first move type and declaring the requested move to be completed after a second settling time has expired if the requested move is second move type, wherein the second settling time is shorter than the first settling time.

In yet another particular embodiment, the DC motor is caused to move based on a periodically determined desired motor position, wherein the desired motor position is determined periodically based a specified time period. In this embodiment, the method further includes determining whether the current desired position is greater than or equal to the requested target position after the DC motor has reached the deceleration position and the deceleration is complete, if the current desired position is greater than or equal to the requested target position, declaring the DC motor to be in a hold state, and if the requested move is a first move type, setting a wait count to a first wait count value and if the requested move is second move type, setting the wait count to a second wait count value. When the DC motor is in the hold state, the method includes performing the following each time the specified time period elapses: determining whether the wait count is greater than zero, if the wait count is not greater than zero, declaring the requested move to be completed, and if the wait count is greater than zero: (i) decrementing the wait count if the requested move is second move type, and (ii) decrementing the wait count if the requested move is a first move type and if an error is less than a predetermined error limed, wherein the error is a difference between the then current desired position and an actual position of the DC motor.

In the case of a printer, such as, without limitation, and inkjet printer, a first move type is a critical move for enabling a first print swath printed on an item of print media to be aligned with a second print swath printed on the item of print media, and a second move type is a non-critical move wherein the item of print media is moved to a position wherein information fully contained within a single print swath is printed on the item of print media.

In still another embodiment, the invention provides a printer that includes a DC transport motor for moving an item of print media toward a requested target position in a requested move, wherein the DC transport motor is structured to execute a first move type and a second move type different than the first move type, a processing device operatively coupled to said DC transport motor, wherein the processing device is adapted to implement one or more of the method embodiments described above.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

As noted elsewhere herein, the settling time of a DC transport motor in an inkjet printer is an important factor determining print quality. However, different types of prints involving different transport moves will have different tolerances for settling time (i.e., certain print types will tolerate shorter settling times than others). Thus, for purposes of describing the present invention, two types of print moves will be defined. Critical print moves are moves in which the transport of the inkjet printer moves the media for print swaths that must be stitched together (i.e., must be aligned), as when the information to be printed spans print swaths. Non-critical print moves are gross positioning moves in which the transport of the inkjet printer moves the media so that information fully contained within a single print swath can be printed.

Figure 1:
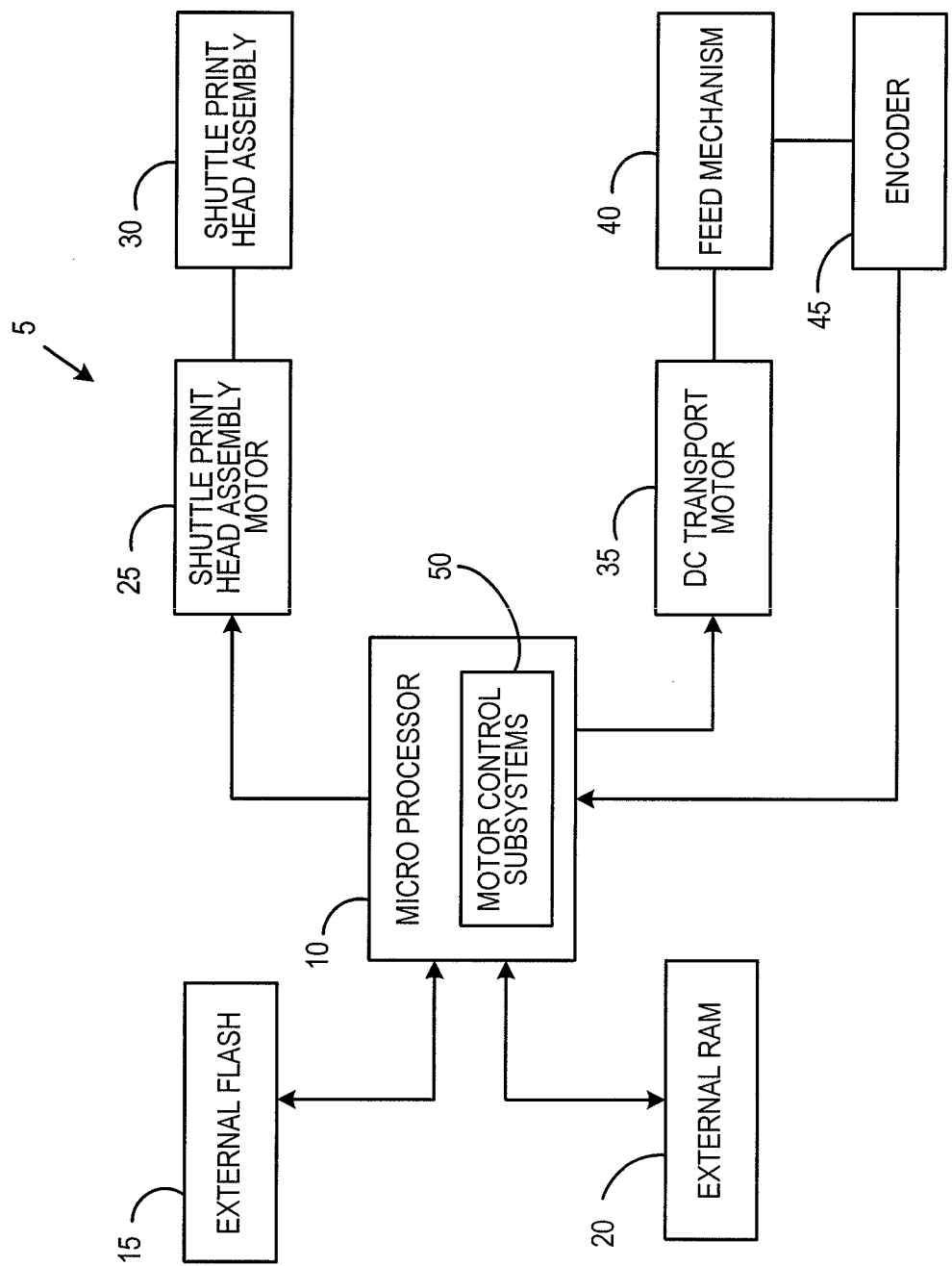
FIG. 1 is a block diagram of an inkjet printer that implements an improved DC motor control method according to one embodiment of the present invention.

FIG. 1 is a block diagram of an inkjet printer 5 that implements an improved DC motor control method according to one embodiment of the present invention. The inkjet printer 5 includes a microprocessor 10, or other suitable processing device such as a microcontroller, for controlling the operation of the inkjet printer 5 as described herein. The inkjet printer 5 further includes an external flash 15 and an external RAM 20 operatively coupled to the microprocessor 10. The external flash 15 is non-volatile memory that stores software code that is executed by the microprocessor 10. The external RAM 20 is memory that stores variables that are referenced by the software code executed by the microprocessor 10. The microprocessor 10 is operatively coupled to a shuttle print head assembly motor 25, such as, without limitation, a stepper motor, which, under the control of the microprocessor 10, drives a shuttle print head assembly 30 to print information on media transported by the inkjet printer 5.

In addition, the inkjet printer 5 includes a DC transport motor 35 which drives a feed mechanism 40, such as a belt assembly coupled to a plurality of rollers, for selectively transporting print media so that information can be printed thereon by the shuttle print head assembly 30. The DC transport motor 35 is operatively coupled to and controlled by the microprocessor 10. In particular, the microprocessor 10 executes code which implements a motor control subsystem 50 that includes a trajectory generator and a closed loop controller, such as, without limitation, a PID controller, a PI (proportional, integral) controller, a lead/lag controller, or some other suitable controller. For illustrative purpose, a PID controller will be described in connection with the present embodiment, but it is to be understood that that is meant to be exemplary only and not limiting. As is known in the art, the PID controller receives a feedback signal indicating the position of the DC transport motor 35 (and therefore the position of an item of print media being transported by the feed mechanism 40) in the form of an encoder count output by an encoder 45 operatively coupled to the feed mechanism 40. The trajectory generator generates and outputs a motion profile which is designed to selectively control the operation of the DC transport motor 35 and therefore the feed mechanism 40 to move an item of print media to a target position for printing. The trajectory generator does so by controlling the angular position of the rotor of the DC transport motor 35 over some period of time. In particular, at some periodic rate (e.g., every 500 microseconds), the trajectory generator outputs and provides a desired position in the form of an encoder count to the PID controller. The actual position as provided by the encoder 45 is subtracted from the desired position to provide a position error which is input into the PID controller. The PID controller creates an output value that is used to generate an electrical current (or voltage) that is provided to the DC transport motor 35 that controls the motion thereof. Thus, as will be appreciated, in response to each output of the trajectory generator, the PID controller will cause the actual position to approach the desired position.

Figure 2:
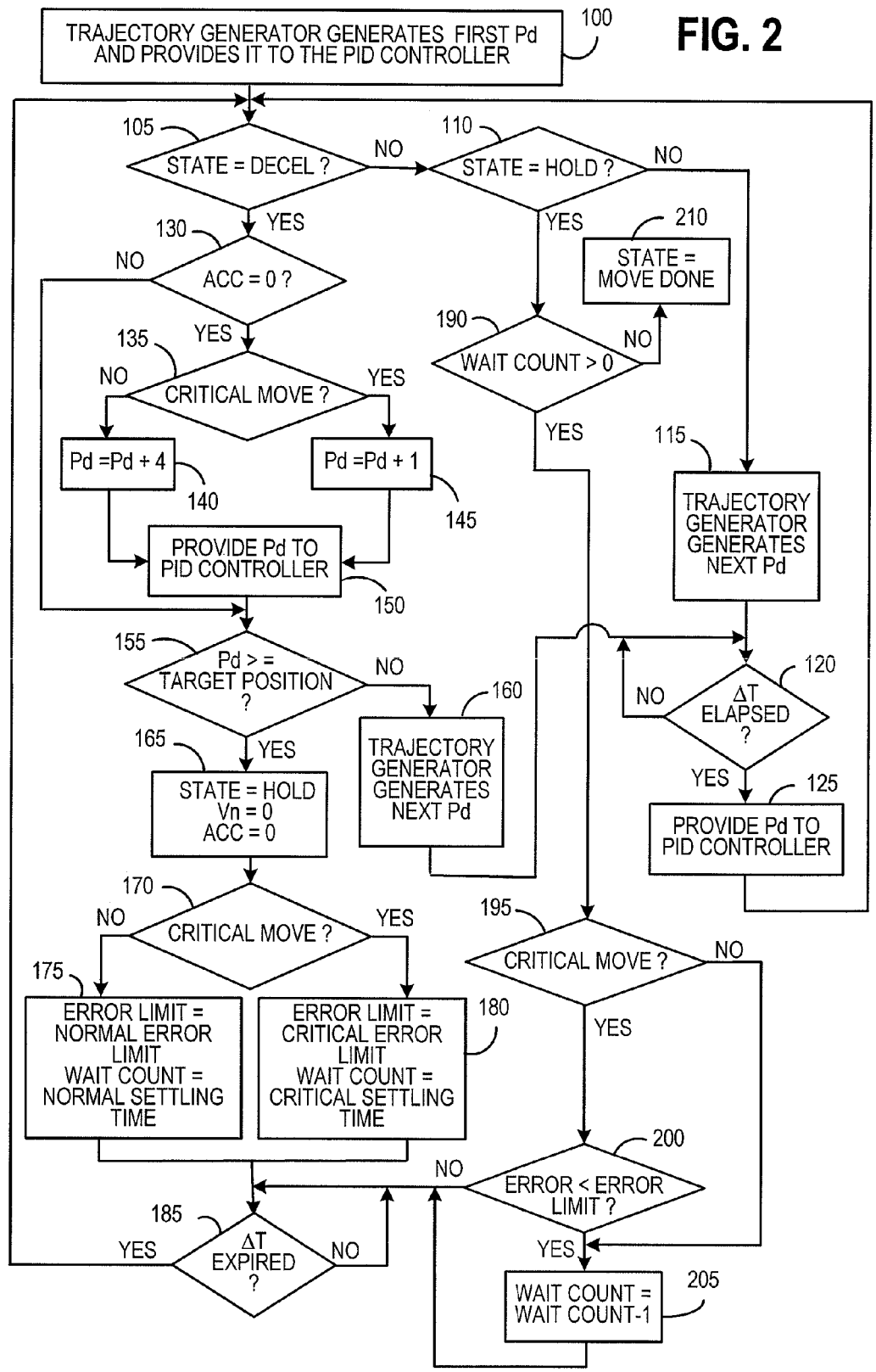
FIG. 2 is a flowchart of a method of controlling a DC motor according to an embodiment of the present invention.

FIG. 2 is a flowchart of a method of controlling a DC motor according to an embodiment of the present invention. In particular, FIG. 2 shows an embodiment of a method for controlling the DC transport motor 35 of the inkjet printer 5 when it is desired to transport an item of print media, such as a piece of paper or an envelope, to a target position for the printing of information in a print swath executed by the shuttle print head assembly 30 on the item of print media. As will be appreciated by those of skill in the art, such a move when executed by the DC transport motor 35 will typically include at least three states: (1) an acceleration state wherein the DC transport motor 35 is accelerated from a starting velocity (e.g., zero), (2) a slewing state wherein the DC transport motor 35 slews at a certain velocity for a period of time, and (3) a deceleration state wherein the DC transport motor 35 decelerates from the slewing velocity to a resting state so that printing can begin (in addition, a fourth, hold state is implemented as an aspect of the present invention). The motion of the DC transport motor 35 according to these states is determined by the output of the trajectory generator implemented in the microprocessor 10. According to an aspect of the invention, the DC motor control method includes calculating a deceleration position (i.e., the position where deceleration will begin) in the microprocessor 10. In order to avoid overshoot, the calculated deceleration position is one which, when the deceleration is executed at the specified rate, will result in the item of print media stopping short of the target position. This deceleration position is preferably specified in terms of a particular encoder count of the encoder 45. When the item of print media is determined to have reached the calculated deceleration position, the state of the DC transport motor 35 will move from the slewing state to the deceleration state, the importance of which is described below.

Referring to FIG. 2, the method begins at step 100, wherein based on a request from a movement requester, such as a print renderer of the inkjet printer 5, to move the item of print media to a requested target position (which corresponds to a requested target position of the DC transport motor 35), the trajectory generator implemented in the microprocessor 10 generates the first desired position Pd and provides that Pd to the PID controller of motor control subsystem 50. As discussed elsewhere herein, a desired position Pd is provided to the PID controller according to some periodic time interval ΔT, such as 500 µs.

At step 105, a determination is made as to whether the current state of the DC transport motor 35 is the deceleration state. If the answer at step 105 is no, then, at step 110, a determination is made as to whether the current state of the DC transport motor 35 is a hold state, which is described in greater detail below. If the answer at step 110 is no, then that means that the current state of the DC transport motor 35 is either the acceleration state or the slewing state and the method proceeds to step 115. At step 115, the trajectory generator implemented in the microprocessor 10 generates the next desired position Pd based on the established state (acceleration or slew). Next, at step 120, a determination is made as to whether ΔT has elapsed since the time that the prior Pd was provided to the PID controller. If the answer is no, then the method returns to step 120 to await the elapse of ΔT. If the answer at step 120 is yes, then, at step 125 the current Pd (generated in step 115) is provided to the PID controller and the method returns to step 105.

Returning to step 105, if the answer is yes, meaning that the current state of the DC transport motor 35 is the deceleration state, then the method proceeds to step 130, wherein the acceleration of the DC transport motor 35 is calculated and a determination is made as to whether the calculated acceleration equals zero (i.e., has zero velocity been reached?). If the answer is no at step 130, meaning the DC transport motor 35 is still decelerating and zero velocity has not been reached, then the method proceeds to step 155 (described below). If, however, the answer at step 130 is yes, meaning zero velocity has been reached (i.e., deceleration is complete), then, at step 135, a determination is made as to whether the requested move is a critical move. If the answer is no, then, at step 140, the desired position Pd is incremented by four encoder counts and, at step 150, that new Pd is provided to the PID controller. If the answer at step 135 is yes, then, at step 145, the desired position Pd is incremented by one encoder count and, at step 150, that new desired position Pd is provided to the PID controller.

At step 155 (following either step 130 or step 150), a determination is made as to whether the current desired position Pd is greater than or equal to the requested target position. If the answer is no, then, at step 160, the trajectory generator implemented in the microprocessor 10 generates the next desired position Pd based on the current desired position Pd and the DC transport motor 35 velocity from the deceleration profile being employed by the trajectory generator. The method then proceeds to step 120 to await the elapse of ΔT, after which the then current desired position Pd will be provided to the PID controller. If, however, the answer at step 155 is yes, meaning that the requested target position has been met or exceeded, then, at step 165, the state of the DC transport motor 35 is set to the hold state, and the velocity and acceleration of the DC transport motor 35 are set to zero. Then, at step 170, a determination is made as to whether the requested move is a critical move. Based on the answer, two different variables will be set which, as described below, are used in the processing after the hold state has been reached. The first of those variables is an Error Limit, and the second of those variables is a Wait Count. If the answer at step 170 is no, then, at step 175, the Error Limit is set to an error value (NormalErrorLimit) that has been established for use with non-critical moves, and the Wait Count is set to a motor settling time value (NormalSettlingTime) that has been established for use with non-critical moves. If the answer at step 170 is yes, then, at step 180, the Error Limit is set to an error value (CriticalErrorLimit) that has been established for use with critical moves, and the Wait Count is set to a motor settling time value (CriticalSettlingTime) that has been established for use with critical moves. Next, at step 185, a determination is made as to whether ΔT has elapsed since last entering step 105. If the answer is yes, the method returns to step 105, and if the answer is no, the method waits for ΔT to elapse.

Returning now to step 110, the processing that is performed after the DC transport motor 35 is placed in the hold state will be discussed. In particular, if the answer at step 110 is yes, the method proceeds to step 190. At step 190, a determination is made as to whether the Wait Count variable is greater than zero. If the answer is yes, then, at step 195, a determination is made as to whether the requested move is a critical move. If the answer is yes, meaning it is a critical move, then, at step 200, a determination is made as to whether a calculated position error equal to the current desired position minus the current actual position of the item of print media as indicated by the encoder 45 is less than the Error Limit established in step 180. If the answer is no, then the method returns to step 185 to await the elapse of ΔT. If, however, the answer at step 200 is yes, then, at step 205, the Wait Count variable is decremented by 1, and the method proceeds to step 185 to await the elapse of ΔT. If the answer at step 200 is no, meaning the requested move is not a critical move, then the method proceeds directly to step 205, wherein the Wait Count variable is decremented by 1. The method then proceeds to step 185 to await the elapse of ΔT.

Returning to step 190, if the answer is no, meaning that the Wait Count is not greater than zero, then, at step 210, the requested move is declared to be completed. Thereafter, the movement requester that requested the move, such as a print renderer of the inkjet printer 5, will be informed of the actual ending position of the item of print media. Based on that information, the movement requester may adjust its data, if necessary, in order to optimize the print (e.g., to cause information to be aligned between two print swaths).

Thus, as described in detail above, the DC motor control method of the present invention avoids overshoot by calculating and employing a deceleration position (i.e., the position where deceleration will begin) wherein, when the deceleration is executed at the specified rate, the deceleration will result in the item of print media stopping short of the requested target position. In addition, once the DC transport motor 35 decelerates and comes to rest, the method will cause the DC transport motor 35 to creep up on the requested target position using different velocities depending on whether the requested move is a critical move. In particular, the DC transport motor 35 will be caused to creep at a faster velocity (e.g., four encoder counts per ΔT) if the move is non-critical, and a relatively slower velocity (e.g., one encoder counts per ΔT) if the move is critical. Finally, a shorter settling time for the DC transport motor 35 will be employed if the move is non-critical, and a relatively longer settling time will be employed if the move is critical.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of controlling a DC motor to cause said DC motor to execute a requested move toward a requested target position of a rotor of said DC motor, said DC motor being structured to execute a first move type and a second move type different than said first move type, said method comprising:

calculating a deceleration rotor position for said DC motor, wherein when said deceleration rotor position is reached, said DC motor will be caused to execute a deceleration in a manner that will result in the DC motor stopping short of said requested target position of said rotor;

after said DC motor has reached said deceleration rotor position and said deceleration is complete, determining whether said requested move is a first move type;

if said requested move is a first move type, causing said DC motor to move toward said requested target position of said rotor at a first velocity;

if said requested move is a second move type, causing said DC motor to move toward said requested target position of said rotor at a second velocity, said second velocity being greater than said first velocity; and wherein said DC motor is caused to move based on a periodically determined desired motor position, the method further comprising:

after said DC motor has reached said deceleration rotor position and said deceleration is complete determining whether the current desired position is greater than or equal to said requested target position of said rotor;

if the current desired position is greater than or equal to said requested target position of said rotor, declaring the DC motor to be in a hold state; and when said DC motor is in said hold state, declaring said requested move to be completed after a first settling time has expired if said requested move is a first move type and declaring said requested move to be completed after a second settling time has expired if said requested move is second move type, said second settling time being shorter than said first settling time.

2. The method according to claim 1, wherein said DC motor is caused to move based on a periodically determined desired motor rotor position that is provided to a closed loop controller, wherein causing said DC motor to move toward said requested target position of said rotor at a first velocity comprises incrementing the then current desired position a first predetermined amount and providing the incremented desired position to the closed loop controller, and wherein causing said DC motor to move toward said requested target position of said rotor at a second velocity comprises incrementing the then current desired position a second predetermined amount and providing the incremented desired position to the closed loop controller, said second predetermined amount being greater then said first predetermined amount.

3. The method according to claim 2, wherein motor rotor position is based on a count of an encoder, wherein said first predetermined amount is a first predetermined number of encoder counts and wherein said second predetermined amount is a second predetermined number of encoder counts.

4. The method according to claim 3, wherein said first predetermined number of encoder counts is a one encoder count and second predetermined number of encoder counts is four encoder counts.

5. The method according to claim 2, wherein said closed loop controller is a PID controller.

6. The method according to claim 2, wherein said closed loop controller is chosen from the group consisting of a lead/lag controller and a PI controller.

7. The method according to claim 1, wherein said DC motor is caused to move based on a periodically determined desired motor rotor position and wherein said desired motor rotor position is determined periodically based a specified time period, the method further comprising:

after said DC motor has reached said deceleration rotor position and said deceleration is complete, determining whether the current desired position is greater than or equal to said requested target position;

if the current desired position is greater than or equal to said requested target position, declaring the DC motor to be in a hold state;

if said requested move is a first move type, setting a wait count to a first wait count value and if said requested move is second move type, setting the wait count to a second wait count value; and when said DC motor is in said hold state, performing the following each time said specified time period elapses:

determining whether said wait count is greater than zero;

if said wait count is not greater than zero, declaring said requested move to be completed; and if said wait count is greater than zero: (i) decrementing said wait count if said requested move is second move type, and (ii) decrementing said wait count if said requested move is a first move type and if an error is less than a predetermined error limed, said error being a difference between the then current desired position and an actual rotor position of said DC motor.

8. The method according to claim 1, wherein said DC motor is part of a printer and causes an item of print media to move.

9. The method according to claim 8, wherein said printer is an inkjet printer.

10. The method according to claim 8, wherein a first move type is a critical move for enabling a first print swath printed on an item of print media to be aligned with a second print swath printed on the item of print media, and wherein a second move type is a non-critical move wherein the item of print media is moved to a position wherein information fully contained within a single print swath is printed on the item of print media.

11. A printer, comprising:
- a DC transport motor for moving an item of print media toward a requested target position of a rotor of said DC motor in a requested move, said DC transport motor being structured to execute a first move type and a second move type different than said first move type;
- a processing device operatively coupled to said DC transport motor, said processing device being adapted to:
- calculate a deceleration rotor position for said DC transport motor, wherein when said deceleration rotor position is reached, said DC transport motor will be caused to execute a deceleration in a manner that will result in the DC transport motor stopping short of said requested target position of said rotor;
- after said DC transport motor has reached said deceleration rotor position and said deceleration is complete, determine whether said requested move is a first move type;
- if said requested move is a first move type, cause said DC transport motor to move toward said requested target position of said rotor at a first velocity; and
- if said requested move is second move type, causing said DC transport motor to move toward said requested target position of said rotor at a second velocity, said second velocity being greater than said first velocity; and
- wherein said DC transport motor is caused to move based on a desired motor rotor position periodically determined by said processing device, the processing device being further adapted to:
- after said DC transport motor has reached said deceleration rotor position and said deceleration is complete, determine whether the current desired position is greater than or equal to said requested target position of said rotor :
- if the current desired position is greater than or equal to said requested target position of said rotor, declare the DC transport motor to be in a hold state; and
- when said DC transport motor is in said hold state, declare said requested move to be completed after a first settling time has expired if said requested move is a first move type and declare said requested move to be completed after a second settling time has expired if said requested move is second move type, said second settling time being shorter than said first settling time.

12. The printer according to claim 11, wherein said processing device is further adapted to implement a closed loop controller, wherein said DC transport motor is caused to move based on a desired motor rotor position periodically determined by said processing device and provided to said closed loop controller, wherein said processing device is adapted to cause said DC transport motor to move toward said requested target position of said rotor at a first velocity by incrementing the then current desired position a first predetermined amount and providing the incremented desired position to the closed loop controller, and wherein said processing device is adapted to cause said DC transport motor to move toward said requested target position of said rotor at a second velocity by incrementing the then current desired position a second predetermined amount and providing the incremented desired position to the closed loop controller, said second predetermined amount being greater then said first predetermined amount.

13. The printer according to claim 12, further comprising a feed mechanism for feeding said item of print media and an encoder operatively coupled to said feed mechanism, wherein motor rotor position is based on a count of said encoder, wherein said first predetermined amount is a first predetermined number of encoder counts and wherein said second predetermined amount is a second predetermined number of encoder counts.

14. The printer according to claim 13, wherein said first predetermined number of encoder counts is a one encoder count and second predetermined number of encoder counts is four encoder counts.

15. The printer according to claim 11, wherein said closed loop controller is a PID controller.

16. The printer according to claim 11, wherein said closed loop controller is chosen from the group consisting of a lead/lag controller and a PI controller.

17. The printer according to claim 11, wherein said DC transport motor is caused to move based on a desired motor rotor position periodically determined by said processing device and wherein said desired motor rotor position is determined periodically based a specified time period, the processing device being further adapted to:
- after said DC transport motor has reached said deceleration rotor position and said deceleration is complete, determine whether the current desired position is greater than or equal to said requested target position of said rotor;
- if the current desired position is greater than or equal to said requested target position of said rotor, declare the DC transport motor to be in a hold state;
- if said requested move is a first move type, set a wait count to a first wait count value and if said requested move is second move type, set the wait count to a second wait count value; and
- when said DC transport motor is in said hold state, perform the following each time said specified time period elapses:
- determining whether said wait count is greater than zero;
- if said wait count is not greater than zero, declaring said requested move to be completed; and
- if said wait count is greater than zero: (i) decrementing said wait count if said requested move is second move type, and (ii) decrementing said wait count if said requested move is a first move type and if an error is less than a predetermined error limed, said error being a difference between the then current desired position and an actual rotor position of said DC transport motor.

18. The printer according to claim 11, wherein a first move type is a critical move for enabling a first print swath printed on the item of print media to be aligned with a second print swath printed on the item of print media, and wherein a second move type is a non-critical move wherein the item of print media is moved to a position wherein information fully contained within a single print swath is printed on the item of print media.

19. The printer according to claim 11, wherein said printer is an inkjet printer, said printer further comprising a print head assembly for printing information on said item of print media and a print assembly motor for moving said print head assembly.

20. The printer according to claim 19, wherein said print head assembly is a shuttle print head assembly.

* * * * *